Sept. 14, 1965  F. BRUNETTO  3,206,675
METHOD AND APPARATUS FOR MEASURING THE FORWARD VOLTAGE
DROP, THE FORWARD LEAKAGE CURRENT, AND THE
REVERSE LEAKAGE CURRENT OF A CONTROLLED
RECTIFIER UNDER DYNAMIC CONDITIONS
Filed June 29, 1961  4 Sheets-Sheet 1
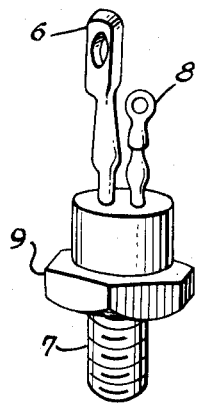
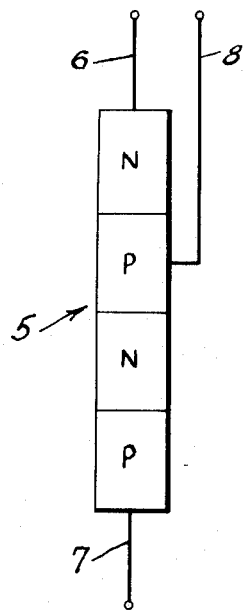
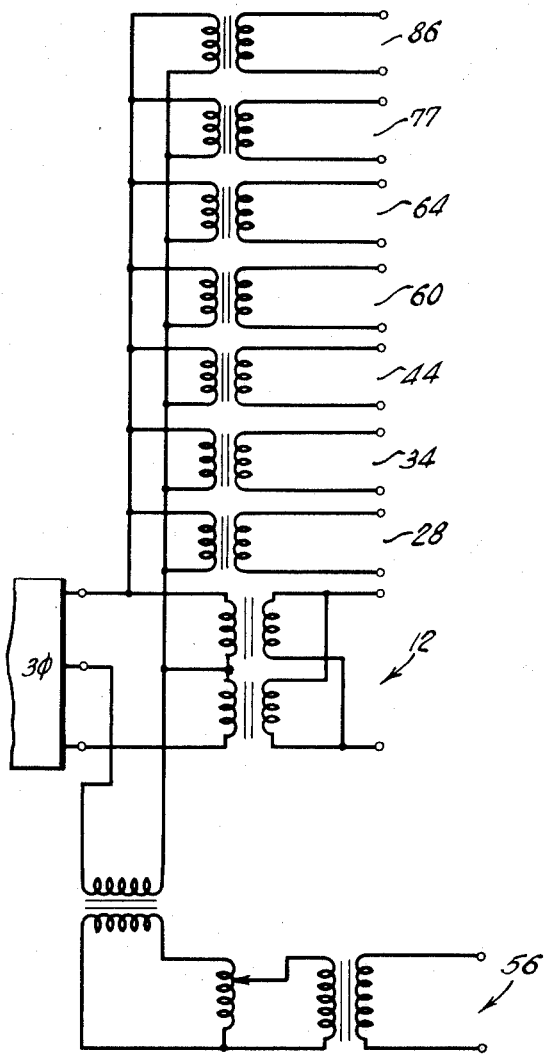
INVENTOR.
FRANK BRUNETTO
BY
Arthur S. Bowers
AGENT

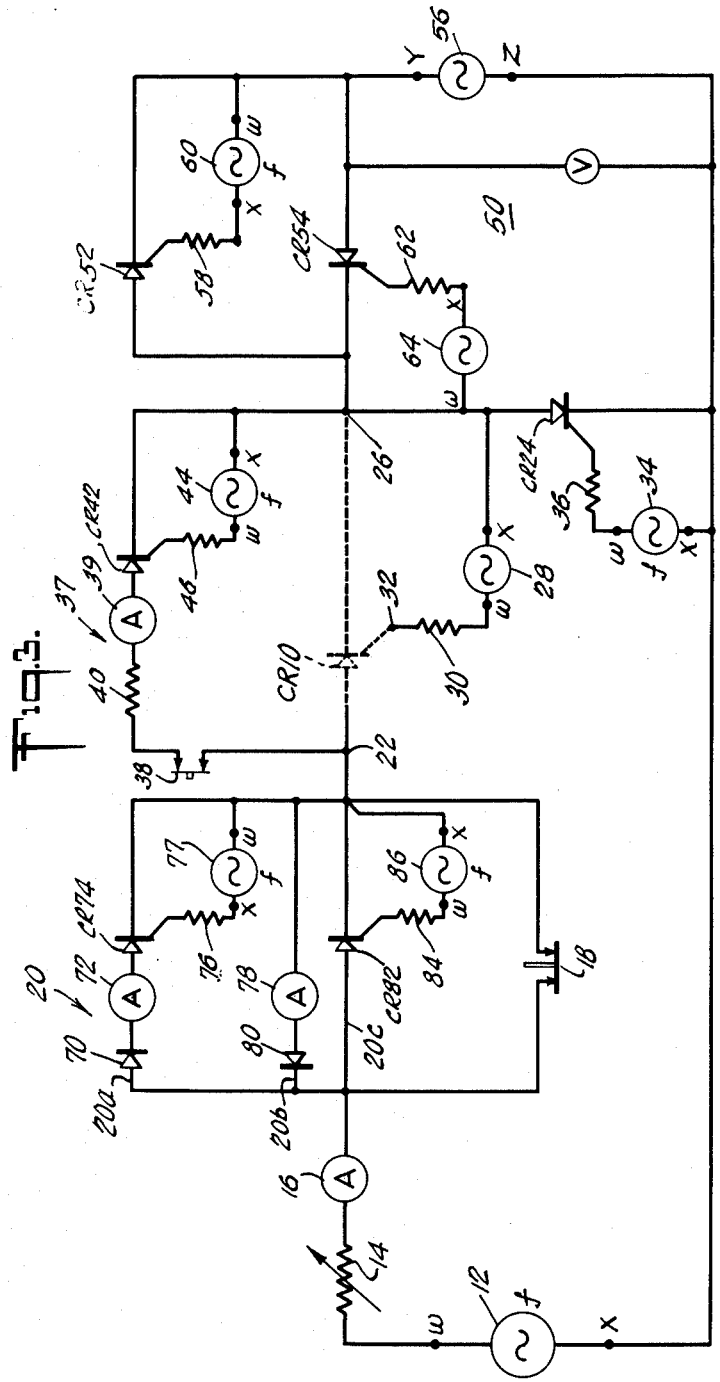

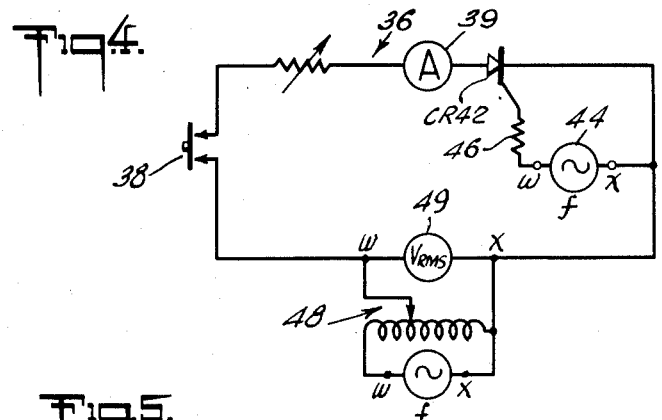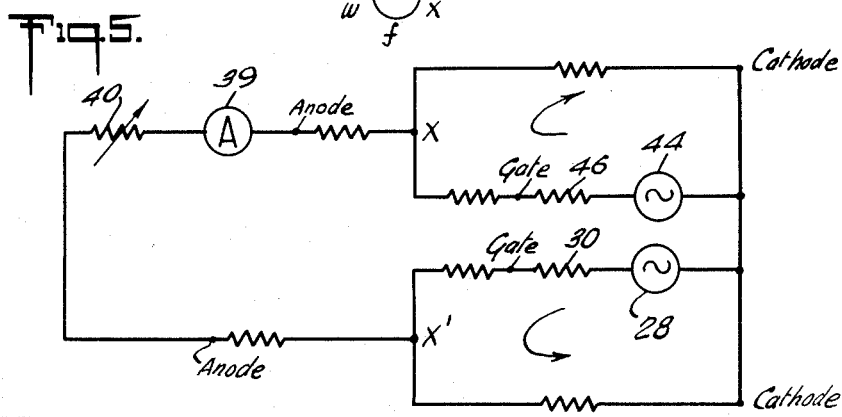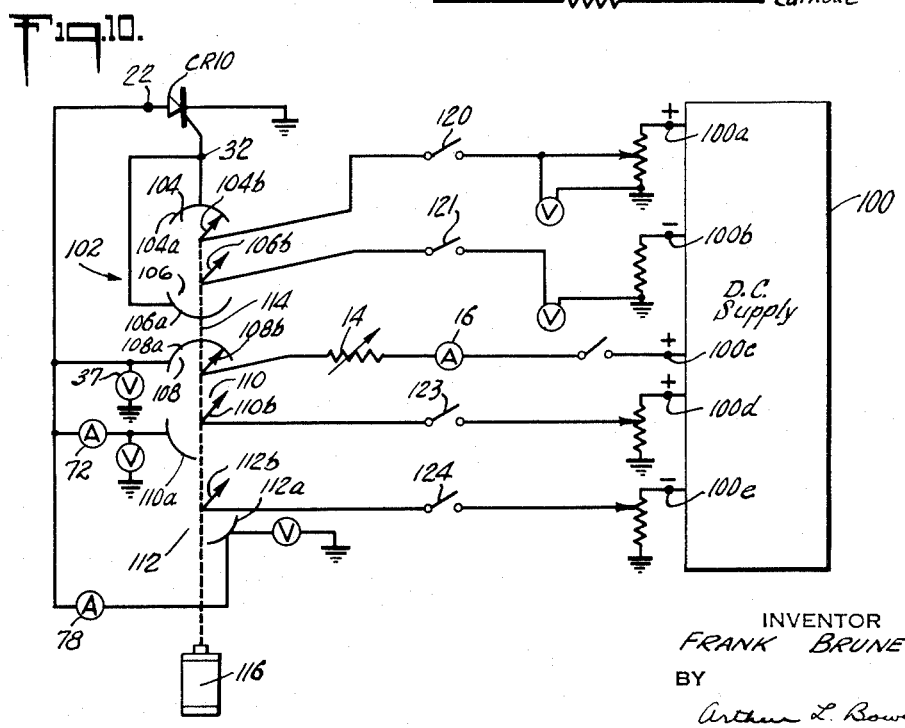

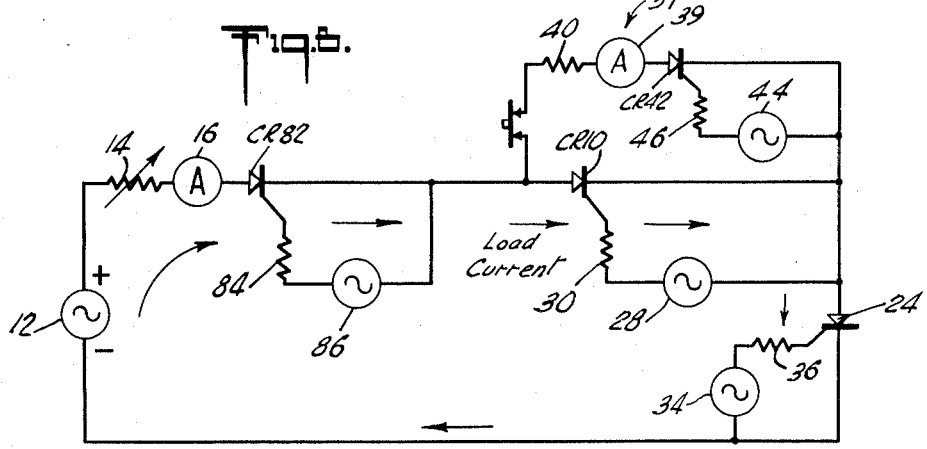
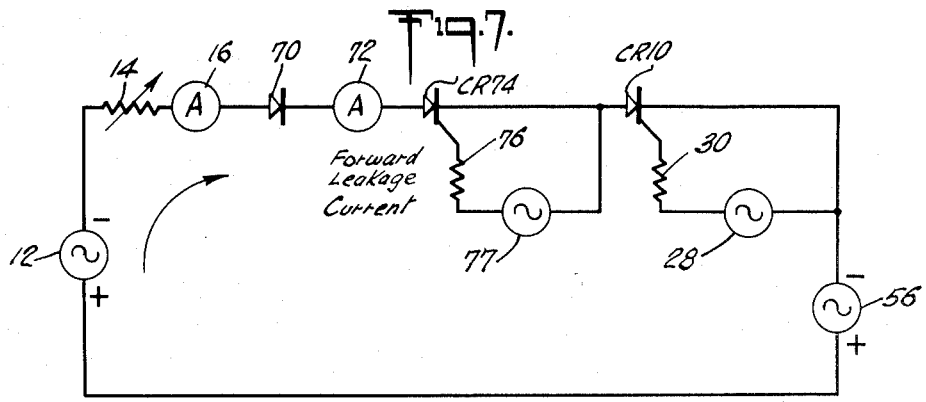
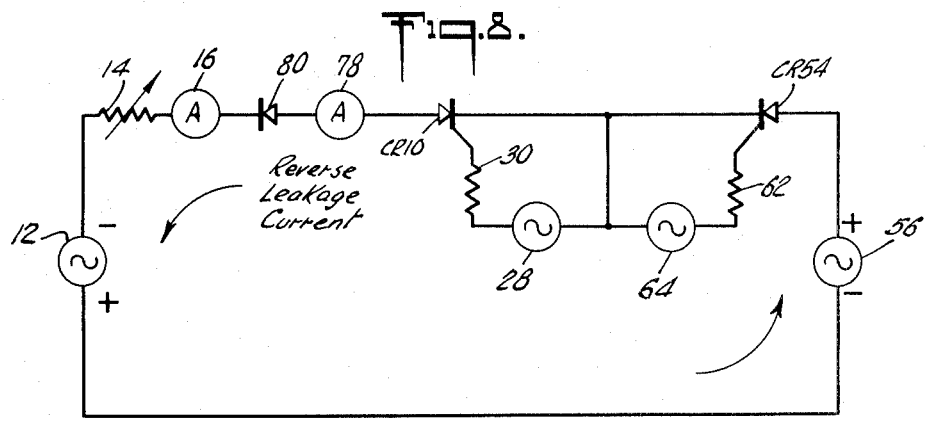

United States Patent Office 3,206,675
Patented Sept. 14, 1965

3,206,675
METHOD AND APPARATUS FOR MEASURING THE FORWARD VOLTAGE DROP, THE FORWARD LEAKAGE CURRENT, AND THE REVERSE LEAKAGE CURRENT OF A CONTROLLED RECTIFIER UNDER DYNAMIC CONDITIONS
Frank Brunetto, 418 Ave. L, Brooklyn, N.Y.
Filed June 29, 1961, Ser. No. 120,800
8 Claims. (Cl. 324—158)
(Granted under Title 35, U.S. Code (1952), sec. 266)

The invention described herein may be manufactured and used by or for the Government of the United States of America for governmental purposes without the payment of any royalties thereon or therefor.

This invention relates to dynamic testing of controlled rectifiers under simulated load conditions.

A controlled rectifier is a solid state switching component, having an anode, cathode, and gate and is capable of performing functions now performed by thyratrons, ignitrons, magnetic amplifiers and power transistors in many circuits. A discussion on the controlled rectifier is published in the periodical Electrical Manufacturing, December 1958 issue, entitled "The Silicon Controlled Rectifier," authored by F. W. Gutzwiller.

The three more significant characteristics of a controlled rectifier are its forward leakage current, reverse leakage current and its forward voltage drop. An ideal controlled rectifier would not have any forward and reverse leakage currents and forward voltage drop. Since the ideal rectifier cannot be produced, it is necessary to measure these characteristics to determine the extent by which they deviate from the ideal. Heretofore, these parameters have been measured under static conditions. Forward leakage current has been determined by applying a unidirectional constant voltage up to rated forward breakover voltage between anode and cathode, anode positive, with the gate open, that is, with no applied voltage between gate and cathode and measuring the current. The reverse leakage current has been determined in the same manner as the forward leakage current but using up to maximum rated peak inverse voltage and with the cathode positive relative to the anode. The forward voltage drop has been determined by passing rated load current between anode and cathode and measuring the anode-cathode voltage drop. These tests have been carried out under static conditions, separately, never together, and results of the static tests have been of little or doubtful value. They did not divulge the time operating characteristics of the controlled rectifier. There is a temperature rise in a controlled rectifier when load current flows therethrough and its internal resistances are lowered by the temperature rise. Therefore, the relationships between load current, temperature rise, change in internal resistances and leakage currents cannot be determined from static tests. Forward and reverse leakage currents are higher when rated load current is flowing through the controlled rectifier than when no load current is flowing and if the controlled rectifier is defective, the temperature and leakage currents may even tend to avalanche; this would not turn up in static tests.

An object of this invention is to measure forward leakage current, reverse leakage current and forward voltage drop in a controlled rectifier under load conditions.

A further object is to simplify, speed up and increase the accuracy and reliability of measurements of forward leakage current, reverse leakage current and forward voltage drop in controlled rectifiers.

A further object is to determine the capabilities, and limitations and explore critical parameters of controlled rectifiers.

Other objects and many of the attendant advantages of this invention will be readily appreciated as the same becomes better understood by reference to the following detailed description when considered in connection with the accompanying drawing wherein:

FIG. 1 is an illustration of the physical configuration of a commercial controlled rectifier;

FIG. 2 illustrates the electronic elements of a controlled rectifier;

FIG. 3 is a circuit diagram of an embodiment of the invention with the controlled rectifier under test shown in broken lines;

FIG. 4 illustrates a method of calibrating the forward voltage drop measuring circuit;

FIG. 5 is an explanatory diagram of the forward voltage drop measuring circuit;

FIGS. 6–8 illustrate current flow through the circuit of FIG. 3 in three successive portions of each cycle;

FIG. 9 illustrates an arrangement for obtaining the sinusoidal voltages and phasings required for the circuit shown in FIG. 3; and FIG. 10 illustrates another form of the invention.

A sample commercial controlled rectifier is illustrated in FIGS. 1 and 2 and includes an N-P-N-P semiconductor configuration 5 with an ohmic contact 6 to the outer N layer serving as a cathode, another ohmic contact 7 to the outer P layer serving as an anode and a third ohmic contact 8 to the central P region for performing the gating function on the load current from anode to cathode. The semiconductor combination is mounted on a copper hexagonal base 9 with a threaded stud extending therefrom and serving as the anode 7 for attaching the unit to a heat sink. Hereinafter, the abbreviation CR is utilized for controlled rectifier.

In the embodiment of the invention illustrated in FIG. 3, CR10, shown in broken lines is a controlled rectifier under test. A low-voltage (e.g., on the order of several volts) low-impedance sinusoidal source 12 that operates at frequency $f$ provides the rated maximum average forward load current of CR10. A variable load current resistor 14 is connected in series with source 12 for adjusting the average load current and the average load current is registered or indicated by direct current ammeter 16 in series with the source 12 and load resistor 14. A normally closed switch 18 in parallel with and shunting a leakage current meter circuit 20, is connected in series between anode terminal 22 and the load current supply circuit 12, 14 and 16. The anode cathode circuit of CR24 is connected in series between cathode terminal 26 of CR10 and the load current source 12. CR24 is substantially the same as CR10 and its load current rating, breakover voltage rating, and peak inverse voltage rating is equal to or greater than the corresponding characteristics of CR10. A gate voltage circuit including sinusoidal source 28 operating at frequency $f$ in series with a gate current limiting resistor 30 is connected between cathode terminal 26 and gate terminal 32 of CR10. A gate voltage circuit including sinusoidal source 34 operating at frequency $f$ and substantially identical to source 28, in series with a gate current limiting resistor 36, is connected between cathode and gate of CR24. Sinusoidal source 12 applies anode-cathode voltage to CR10 and C24 in phase with both the sinusoidal gating voltages applied to CR10 and CR24 whereby load current flows unidirectionally from source 12 through CR10 and CR24, for the one-half of each cycle minus several degrees at the leading end that the anode-cathode voltage is positive; during the first several degrees load current does not flow because anode potential and gating potential are not high enough for the gating action. The amplitude of the gating voltages provided by sources 28 and 34 are equal to substantially maximum rated gate-cathode voltage of CR10 and CR24. Current limiting resistors 30 and 36 are included to minimize gate-cathode current flow and the accompanying heating effects after the gate voltage initiates anode-cathode current flow. The amplitude of voltage output of sources 28 and 34 are not selected to be so low as render unnecessary the resistors 30 and 36 because reducing the amplitude of the gating voltage relative to rated gating voltage would delay the gating of CR10 perhaps by several degrees, due to increase in the rise time of the gating voltage. In the circuit as thus far described with CR10 connected and with sinusoidal sources 12, 28 and 34 operating, resistor 14 is adjusted so that rated maximum average load current of CR10 flows through the circuit in the form of sinusoidal, approximately 175 degree, unidirectional current impulses. For data collection or life tests, the circuit is operated in an environment where the ambient temperature is approximately constant, e.g., 25 degrees C. Temperature recording means are not shown but if temperature data is desired, a thermocouple may be attached to a selected portion of the CR10 assembly and coupled to a temperature-time recorder.

A forward voltage drop measuring circuit 37 is connected between anode terminal 22 and cathode terminal 26 and includes, in series a normally open switch 38, a D.C. milliammeter or microammeter 39 and resistor 40, and the anode-cathode circuit of CR42. A gating voltage circuit for CR42 includes, in series, sinusoidal source 44 operating at frequency $f$ in phase with source 28, and gate current limiting resistor 46 and are connected between gate and cathode of CR42. The scale of meter 39 is calibrated to indicate the forward voltage between terminals 22 and 26 averaged over 360 degrees.

A method of calibrating the forward voltage drop measuring circuit 37 is illustrated in FIG. 4 and includes connecting the circuit 37 across an adjustable voltage sinusoidal source 48 of frequency $f$ that operates in phase with gating source 44. An R.M.S. voltmeter 49 is connected across source 48. When the input voltage from source 48 is zero and source 44 is operating, meter 39 deflects in the negative or reverse direction. As source 48 is adjusted in the direction of increasing input voltage the pointer of meter 39 is deflected back to zero; the R.M.S. voltage indicated by meter 49, when the pointer of meter 39 is at zero, is recorded. Then, the source 48 is adjusted in steps to produce selected indications on the meter 39 and the corresponding R.M.S. voltages are recorded. The R.M.S. voltages are converted to half wave sinusoidal voltage averaged over 360 degrees by multiplying by 0.45.

To measure the anode-cathode forward voltage drop of CR10, switch 38 is closed. During each cycle of in-phase sinusoidal source 12, 28, 44, CR42 is rendered conductive concurrently with initiation of load current through CR10 and blocks current flow through meter 39 during the remainder of each cycle when there is no load current flowing through CR10. CR42 must have a forward breakover and peak inverse voltage rating equal to or preferably greater than CR10 so that any forward and reverse leakage currents flowing through CR42 will be of such low magnitude that they will not have any significant effect on the forward voltage drop registered on meter 39.

It is important that the gate current limiting resistor 46 for CR42 to be of greater resistance rating (e.g., three times greater) than the gate current limiting resistor 30 of CR10, and that the gate current limiting resistors 30 and 46 be located on the same side of sources 28 and 44 in the respective gating circuits.

If resistor 46 is not greater than resistor 30 erroneous forward voltage drop readings are obtained. FIG. 5 illustrates the controlled rectifiers as Y connected resistors extending from anode, cathode, and gate terminals to a junction X and X' within the controlled rectifiers. Assuming an instant when the gate-cathode potentials of CR10 and CR42 are positive and no load current is flowing through the anode-cathode section of CR10, a difference of potential exists between junction X' and the cathode of each controlled rectifier. The cathodes are at the same potential but the junctions X and X' are not likely to be at the same potential. By choice of the relative resistance ratings of resistor 30 and resistor 46, either junction X or X' can be made to have the higher potential. If junction X of CR42 is at a higher potential than X' of CR10, the pointer of meter 39 deflects in the negative direction. The difference of potential may be sufficient to prevent the pointer from being deflected back even to zero when the load current flows through CR10. Under this condition measurement of forward voltage drop is not possible. Therefore, it is essential that the potential across CR42 be no greater than that across CR10. If it is less, the pointer of meter 39 is deflected slightly in the positive direction when load current is zero, but when load current flows a higher potential is developed between anode and cathode of CR10 and overshadows the no load potential across the meter 39 and the number registered on the meter is forward voltage drop. Therefore, resistor 30 should be smaller than resistor 46 in order that junction X' of CR10 be positive with respect to junction X of CR42. For similar reasons the gate current limiting resistors should be located on the same side of the sources 28 and 44 in the respective gating circuits.

Leakage current is the current that flows in the anode-cathode circuit when the load current is off and the gate cathode potential is zero or negative. Forward leakage is measured by applying positive voltage from anode to cathode of an amplitude approximately equal to rated maximum breakover voltage. Reverse leakage is measured by applying positive voltage from cathode to anode aproximately equal to rated peak inverse voltage. The amplitude of the voltage required for measuring leakage current is higher than that of the load current source.

A source 50 of breakover and rated inverse voltage is connected across CR24. It includes a pair of controlled rectifiers CR52 and CR54 connected back-to-back to function as a switch and a sinusoidal high voltage low current source 56 compared to source 12 operating at frequency $f$, 90° out of phase with load current source 12 for applying approximately rated breakover and rated peak inverse voltage to CR10. The gating circuit for CR52 includes a gate current limiting resistor 58 and sinusoidal source 60 operating at frequency $f$ and applying gating voltage to CR52, 180° out of phase with the gate voltage for CR10 to render CR52 conductive during the half cycle that CR10 is non conductive; the forward leakage current of CR10 passes through CR52. The gating circuit for CR54 includes a gate current limiting resistor 62 and sinusoidal source 64 operating at frequency $f$ and applying gating voltage to CR54 180° out of phase with the gate voltage for CR10 to render CR54 conductive during the half cycle that CR10 is non conductive; the reverse leakage current of CR10 passes through CR54. CR52 and CR54 have breakover voltage ratings and peak inverse voltage ratings at least equal to and preferably greater than the corresponding ratings of CR10.

The leakage current measuring circuit 20, includes three parallel branches 20a, 20b and 20c which are conductive in sequence, during distinct non overlapping portions of each 360 degrees of circuit operation. The forward leakage current passes through the branch 20a which includes rectifier 70, D.C. milliammeter 72, and CR74 having a gate circuit including gate current limiting resistor 76 and sinusoidal gating source operating at frequency $f$ and 180° out of phase with source 28 in the gate circuit of CR10. The rectifier 70 might appear to be an excess element but it has been found to be necessary to obtain accurate readings because the cathode to anode resistance of a controlled rectifier when the gate is positive is low enough to pass sufficient reverse current to have significant effect on measurements of the forward leakage current and can cause substantially erroneous current registration on ammeter 72. The reverse leakage current passes through branch 20b which includes a D.C. ammeter 78 and a rectifier 80 conductive in the direction opposite to that of branch 20a. The two branches 20a and 20b operate independently and each branch may be utilized without the other branch. The branch 20c functions as a short circuit shunt across branches 20a and 20b during that part of each cycle that load current flows through CR10 and as an open circuit during the remainder of each cycle; it includes controlled rectifier CR82 and a gating circuit including a gate current limiting resistor 84 and a sinusoidal gate voltage source 86 of frequency $f$ operating in phase with sinusoidal gate voltage source 28 in the gating circuit for CR10 whereby CR10 and CR82 are rendered conductive and non conductive in step. The load current rating, breakover voltage rating, and peak inverse voltage rating of CR82 is equal to or greater than the corresponding ratings of CR10.

FIG. 6 illustrates the path of load current flow which occurs only during each positive half cycle of source 12, i.e., when the upper terminal of source 12 goes positive relative to the lower terminal. Current flows through the forward voltage drop measuring circuit during this part of each cycle. FIG. 7 illustrates the path of forward leakage current which occurs when the lower terminal of source 12 is negative relative to its upper terminal and when the lower terminal of source 56 is positive relative to its upper terminal. FIG. 8 illustrates the path of reverse leakage current which occurs when the lower terminal of source 12 is positive relative to its upper terminal and the upper terminal of source 56 is positive relative to its lower terminal. In each of FIGS. 6–8 only those elements are included which are conductive during the respective portions of each cycle.

FIG. 9 illustrates one circuit arrangement for obtaining sinusoidal voltages with the proper phasing which is essential for operation of this circuit and includes a plurality of independent transformer circuits and a Scott-T connection. Only the high voltage source 56 is shown as including voltage adjustment means; the other voltage sources may include adjustment means if the circuit is to be used for testing controlled rectifiers of various ratings. Sources 28 and 44 may be combined to eliminate one source; however, all of the other sources must be independent, else there will be shorting or improper operation.

In FIG. 10, there is shown another embodiment of this invention including a direct current power supply 100 and a mechanical motor driven multi-deck switch 102. The power supply 100 is shown as one block having five terminals 100a, 100b, 100c, 100d, and 100e for convenience of illustration but five independent sources of appropriate potential and power rating may be used. Switch 102 includes five sector switches 104, 106, 108, 110, and 112 having arcuate contacts 104a, 106a, 108a, 110a, and 112a respectively and rotary contactors 104b, 106b, 108b, 110b, and 112b respectively that are keyed together to a common shaft 114 shown in broken lines which is connected to a motor 116. The contacts 104a, 106a, and 108 extend arcuately for almost 180 degrees and contacts 110a and 112a extend arcuately almost 90 degrees. The contacts and contactors are oriented so that for approximately one-half of a shaft rotation contacts 104 and 108 only are closed and the other switches are open. For approximately the next one quarter of a shaft rotation after switches 104 and 108 are open, switches 106 and 112 only are closed. For approximately the succeeding quarter of a shaft rotation, after switch 112 is open, switches 106 and 110 are closed. After switches 106 and 110 are open the cycle repeats. Contactors 104b and 106b are connected to potentiometers connected to low voltage gate terminals 100a and 100b of opposite polarity. Voltmeters are connected to indicate the gating voltage. Contactor 108b is connected in series with load current adjusting rheostat 14, ammeter 16, as in FIG. 3 and to load current terminal 100c. A voltmeter 37 for measuring forward voltage drop is connected between contactor 108a and ground. Contactors 110b and 112b are connected to potentiometers connected to comparatively higher voltage terminals 100d and 100e for applying breakover and peak inverse voltages respectively. Forward leakage current is indicated by ammeter 72 connected between contact 110a and anode terminal 22; reverse leakage current is indicated by ammeter 78 connected between contact 112a and anode terminal 22. To lend greater versatility to the apparatus switches 120–124 permit tests while simulating various combinations of conditions. The apparatus shown in FIG. 10 operates similarly to that shown in FIG. 3 but it has advantages and disadvantages when compared with the apparatus in FIG. 3. The apparatus in FIG. 10 has the advantage that the apportionment of the cycle to load current, reverse current and forward leakage current may be other than 180–90–90, depending upon choice of switch design. It has a disadvatage in that more of each cycle is idle to ensure no overlap between a switch that is opening and one that is closing. It has another disadvantage in that mechanical switching even at 60 cycles requires 3600 r.p.m. and at 3600 r.p.m. it is difficult to maintain constant resistance conditions in the switch elements and it is even more difficult to switch appreciable load current on and off 7200 times per minute. For freqeuncies of 400 cycles and up, mechanical switching is impractical.

Pulse circuitry may be used to duplicate the action of the switch in FIG. 10 utilizing five independent pulse sources and a common trigger source. While the 360 degrees of each cycle can be more completely utilized the cost of reliable pulse equipment for life tests with duty cycle and period contemplated herein and the difficulty of adjustment of the pulse circuitry by other than skilled laboratory personnel are significant disadvantages.

It is advisable to temporarily short the leakage meters whenever the high voltage is switched on suddenly instead of being gradually raised to the test value because there may be severe transients that may damage the meters. After the high voltage is switched, the meter shorts are removed. If the high voltage is changed gradually there is no need to short the leakage meters.

Obviously many modifications and variations of the present invention are possible in the light of the above teachings. It is therefore to be understood that within the scope of the appended claims the invention may be practiced otherwise than as specifically described.

I claim:

1. A method of measuring dynamically under predetermined load current, up to rated load current, the forward voltage drop, the forward leakage current and the reverse leakage current of a controlled rectifier having an anode, cathode, and gate element of the type wherein positive potential between gate element and cathode can initiate load current when the anode to cathode potential is positive but cannot control the conduction once initiated comprising applying a sinusoidal gating voltage between control element and cathode, applying from anode to cathode positive half cycles of a sinusoidal voltage in phase with positive half cycles of said gating voltage and of sufficient amplitude to pass said predetermined load current through the controlled rectifier, metering the forward voltage drop from anode to cathode of said controlled rectifier during said in-phase positive half cycles of anode-cathode and gate-cathode voltages, during each negative half cycle of sinusoidal voltage from gate element to cathode applying from anode to cathode coincident with approximately 90° of each negative half cycle of gating voltage a positive approximately quarter cycle of sinusoidal voltage of the same frequency as the gating voltage and of amplitude approximately equal to rated breakover voltage, metering the forward leakage current through the controlled rectifier under test during that approximately 90° of each cycle, and applying from anode to cathode during the remainder of each gating voltage cycle a negative approximately quarter cycle of sinusoidal voltage of the same frequency as the gating voltage and of amplitude approximately equal to rated peak inverse voltage, and metering the reverse leakage current through the controlled rectifier under test during the remainder of each gating voltage cycle.

2. A method of dynamically measuring under predetermined load current up to rated load current the forward voltage drop, the forward leakage current, and the reverse leakage current of a controlled rectifier having an anode, cathode, and gate element comprising applying a periodic gating voltage between gate element and cathode that renders the gate element positive relative to the cathode for part of each period, during that part of each period that the gate is positive applying a positive anode-cathode voltage for passing said predetermined load current through said controlled rectifier and metering the resultant forward voltage drop from anode to cathode, applying between anode and cathode during a predetermined fraction of the remaining portion of each gating period a positive voltage of peak value approximately equal to the rated forward breakover voltage and metering the resultant leakage current, and applying during another nonoverlapping predetermined fraction of the remaining portion of each gating period, a negative voltage of peak value approximately equal to the rated peak inverse voltage and metering the resultant leakage current.

3. A method of dynamically measuring the forward voltage drop, the forward leakage current and the reverse leakage current of a controlled rectifier having an anode, cathode, and gate element, comprising applying periodic positive gating voltage impulses of selected amplitude between gate element and cathode and applying positive anode-cathode voltage impulses concurrently with the periodic positive gating impulses to pass periodic load current impulses through said controlled rectifier and registering the load current and the forward voltage drop; during the portion of each gating voltage period when no positive gating voltage is applied, applying during a fraction of that portion a positive anode to cathode voltage and registering the resultant forward leakage current, and applying during another nonoverlapping fraction of that portion a negative anode to cathode voltage, and registering the resultant reverse leakage current, whereby the relationship of load current, forward voltage, forward leakage current, and reverse leakage current may be obtained under dynamic conditions for various combinations of operating conditions.

4. A dynamic test circuit for use in measuring under load conditions, reverse leakage current in a controlled rectifier having an anode, a cathode and a gate, comprising, in series, a sinusoidal power means for passing load current through the anode-cathode circuit of the controlled rectifier to be tested, a variable resistor for adjusting the load current, a load current ammeter, the anode-cathode circuits of first and second in-circuit controlled rectifiers, and spaced apart anode and cathode terminals for the controlled rectifier to be tested all connected in the same anode-cathode sequence around the series circuit; a gate terminal for the controlled rectifier to be tested, three distinct sinusoidal gating sources operating in phase with and at the same frequency as said power means, two of said gating sources being connected between gate and cathode of said in-circuit controlled rectifiers and the third being connected between said gate and cathode terminals for the controlled rectifier to be tested whereby gating action in the three controlled rectifiers occurs in coincidence; a sinusoidal source of reverse voltage operating at the same frequency but 90 degrees out of phase with said power means and of substantially higher output potential than said power means; the anode-cathode circuit of a third controlled rectifier connected in series with said reverse voltage source, a fourth sinusodial gating source operating 180 degrees out of phase with the other said gating sources connected between the gate and cathode of said fourth controlled rectifier; the series connected reverse voltage source and third in-circuit controlled rectifier connected in parallel across said first in-circuit controlled rectifier for conduction in the opposite direction relative thereto; an ammeter for measuring reverse leakage current and a rectifier, in series therewith, together connected in parallel across the said second in-circuit controlled rectifier for conduction in the opposite direction relative thereto.

5. A dynamic test circuit for use in measuring reverse leakage current as defined in claim 4 further including means connected between the anode and cathode terminals of the controlled rectifier to be tested for measuring voltage drop thereacross resulting from load current flow only.

6. A dynamic test circuit for use in measuring under load conditions, forward leakage current in a controlled rectifier having an anode, a cathode, and a gate, comprising, in series, a sinusoidal power means for passing load current through the anode-cathode circuit of the controlled rectifier to be tested, a variable resistor for adjusting the load current, a load current ammeter, the anode-cathode circuits of first and second in-circuit controlled rectifiers and spaced apart anode and cathode terminals for the controlled rectifier to be tested, all connected in the same anode-cathode sequence around the series circuit; a gate terminal for the controlled rectifier to be tested, three distinct sinusoidal gating sources operating in phase and at the same frequency as said power means, two of said gating sources being connected between gate and cathode of said in-circuit controlled rectifiers and the third being connected between said gate and cathode terminals for the controlled rectifier to be tested whereby gating action in the three controlled rectifiers occurs in coincidence; a sinusoidal source of reverse voltage operating at the same frequency but 90 degrees out of phase with said power means and of substantially higher output potential than said power means; the anode cathode circuit of a third controlled rectifier connected in series with said reverse voltage source, a fourth sinusoidal gating source operating at the same frequency and 180 degrees out of phase with the other said gating sources connected between gate and cathode of said fourth controlled rectifier; the series connected forward leakage voltage source and third in-circuit controlled rectifier connected in parallel across said first in-circuit controlled rectifier for conduction in the same direction; an ammeter for measuring forward leakage current, a rectifier and the anode-cathode circuit of a fourth controlled rectifier connected in series and together connected in parallel across said second in-circuit controlled rectifier for conduction in the same direction relative thereto, and a fifth sinusoidal gating source operating at the same frequency but 180 degrees out of phase with said power means.

7. A dynamic test circuit for use in measuring forward leakage current as defined in claim 6, further including means connected between the anode and cathode terminals of the controlled rectifier to be tested for measuring voltage drop resulting from load current flow only.

8. A dynamic test circuit for use in measuring under load conditions forward and reverse leakage currents and forward voltage drop in a controlled rectifier comprising anode, cathode, and gate terminals for the controlled rectifier to be tested, power supply means connected in circuit with said anode and cathode terminals and operable cyclically to pass rated average load current through the anode cathode terminals, to apply peak inverse voltage to the anode cathode terminals, and to apply forward breakover voltage to the anode cathode terminal in nonoverlapping sequence, means connected between gate and cathode terminals to apply positive gating voltage when said power supply means is operable to pass load current through the anode and cathode terminals and to terminate the positive gating voltage no later than termination of the load current flow, means connected in circuit with said anode and cathode terminals and operable only when forward breakover voltage is applied for registering forward leakage current, means connected in circuit with said anode and cathode terminals and operable only when peak inverse voltage is applied for registering reverse leakage current, and means connected between the anode and cathode terminals and operable only when load current flows to register forward voltage drop between the anode and cathode terminals.

References Cited by the Examiner

UNITED STATES PATENTS 3,134,944  5/64  Newman _____ 324—158

OTHER REFERENCES

General Electric: "Controlled Rectifier Manual," first edition, copyright March 21, 1960, pages 198–203 applied.

WALTER L. CARLSON, *Primary Examiner.*

FREDERICK M. STRADER, *Examiner.*